A. K. SLOAN.
APPARATUS FOR UNITING METALS.
APPLICATION FILED DEC. 5, 1913.
1,235,608.
Patented Aug. 7, 1917.
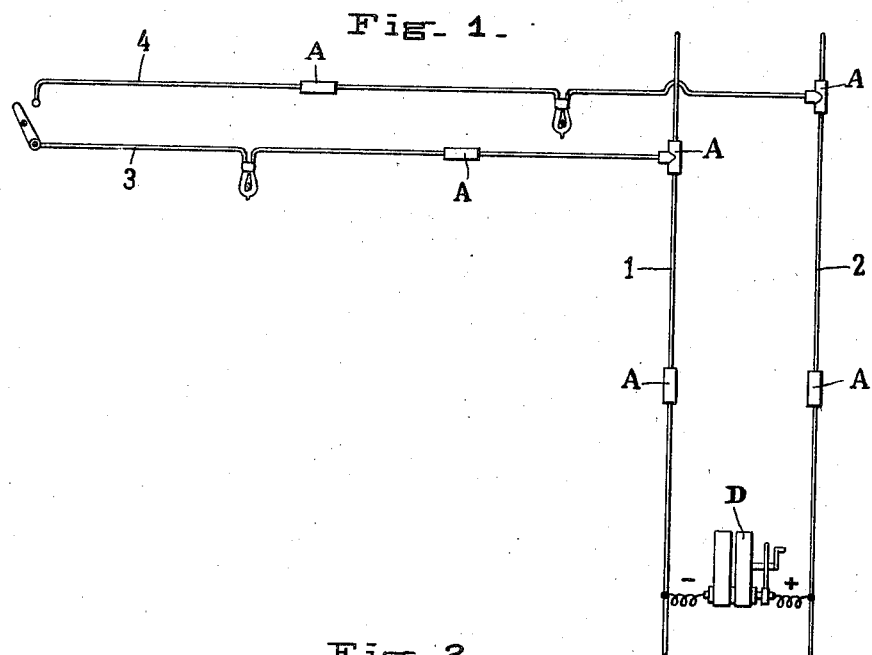
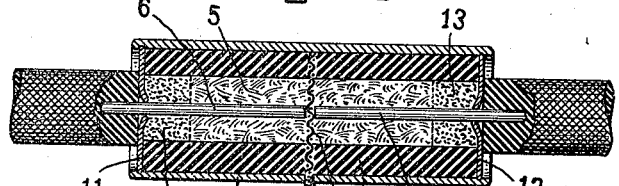
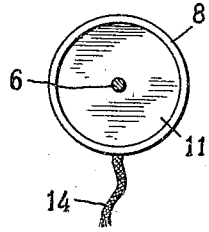
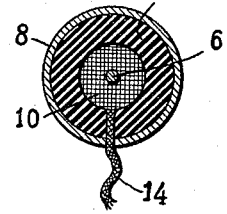
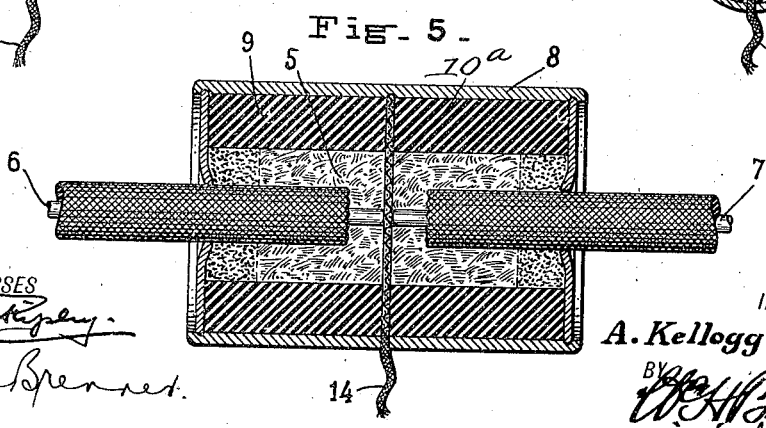
WITNESSES
INVENTOR
A. Kellogg Sloan,
BY
ATTORNEY

UNITED STATES PATENT OFFICE.

AUGUSTUS KELLOGG SLOAN, OF BROOKLYN, NEW YORK.

APPARATUS FOR UNITING METALS.

1,235,608.   Specification of Letters Patent.   Patented Aug. 7, 1917.

Application filed December 5, 1913. Serial No. 804,860.

*To all whom it may concern:*

Be it known that I, AUGUSTUS KELLOGG SLOAN, a citizen of the United States, and a resident of Brooklyn, in the county of Kings and State of New York, have invented certain new and useful Improvements in Apparatus for Uniting Metals, of which the following is a full, clear, and exact description, whereby any one skilled in the art may make and use the same.

The invention relates to an apparatus for uniting metals and incidentally to the method employed in welding, brazing or soldering together two disconnected pieces of metal.

As illustrated and described herein, the invention is applied to a particular field, namely that of welding wire into continuous lengths.

The object of the invention is to provide for the welding of metal by igniting a compound surrounding the adjacent ends of the metal and producing an intense local heat sufficient to reduce and unite the metals.

A further object is to provide a simple form of device into which the ends of the metal to be joined may be conveniently inserted and which will act as an inclosing envelop to provide a local field of intense heat for reducing and joining the two pieces of metal forming a joint of homogeneous material of low resistance; and a still further object is to provide for automatically and immediately insulating a union so made.

A still further object is to provide for uniting metals by igniting a compound surrounding and inclosing the adjacent ends of the metal either by the direct application of an igniting heat or by an electric arc.

In the accompanying drawings, the apparatus is described in conjunction with the making of joints in an electric wiring system. This illustration exemplifies an important use to which the invention might be adapted and serves as a convenient means of illustration.

Referring to the drawings,

Figure 1 is a diagrammatic view illustrating the apparatus as used for simultaneously welding wire connections throughout a wiring system of electrical transmission.

Fig. 2 is a detail sectional view on enlarged scale of what may be termed a welding cartridge.

Fig. 3 is an end view of the same.

Fig. 4 is a central cross-sectional view.

Fig. 5 is a sectional view similar to that of Fig. 2 illustrating the wires with their insulation introduced into the cartridge.

In welding, brazing, soldering or otherwise joining two pieces of metal, it has of course been necessary to utilize gases under extreme pressure, torches or other open flame apparatus, for heating the parts to be joined and ordinarily in a welding operation, a flux must be employed.

Even in the simplest case, that of using solder, a similar operation must be performed and in any of these well-known practices, the operator must be subject to all the dangers of explosion and liability of burns.

In modern wiring systems, particularly for building construction, there are definite and iron-clad rules requiring the forming of unions with solder and a great amount of time is consumed in twisting wires together, soldering and insulating them and this ordinarily must be done at each particular joint as the wires and electrical apparatus are installed, inasmuch as the joints must be insulated. This requires not only great care and attention, but results at best in a soldered joint of somewhat uncertain character.

Each joint in such a wiring system must be made with the expenditure of considerable time and often under difficulties where the joints are in inaccessible places and making of these joints often results in the kinking and bending of the wires of the system. Furthermore, each joint must be thoroughly insulated by any of the well-known methods of applying tape or compound to cover the conductors which have been bared for the purpose of forming the joint and soldering it. There is also the danger and inconvenience attendant upon the use of torches for heating.

One application of the method and apparatus for uniting metals, which is specifically described herein as illustrative of the efficiency of the invention, obviates the many faults heretofore enumerated and shows a simple apparatus into which the ends of the wires to be joined may be inserted. The device forms an inclosure for the adjacent ends of the wires and as many joints as desired may be made in the system. When the entire wiring system is installed with the welding cartridges hereinafter described, covering each of the joints, the application of an electric current to the wires will cause an ignition spark at the joints to be formed and immediately compounds surrounding the said joints will be ignited. This compound, when ignited, will produce an intense heat which is sufficient to reduce and weld the wires together. If desired, in lieu of using an electric spark for igniting the charge of the welding cartridge, a powder fuse 14, such as hereinafter referred to, may be employed but, of course, where such fuses are used, the charge of each cartridge must be ignited separately. In lieu of the jump spark igniter, each welding cartridge may contain a fusible wire which burns when the power is applied (for regular service) thus igniting the contents of the cartridge.

In the accompanying drawings there is illustrated a diagrammatic outline of a wiring system where the main line wires 1, 2 and branch wires 3, 4 are illustrated as having welding cartridges A applied at various points where it is desired to connect two sections of the wire together. D indicates a generator preferably of the magneto type which may be conveniently applied to the main wires of the circuits and which will provide a sufficient current for causing a slight arc at each of the joints which will be sufficient to ignite the charge within the welding cartridges.

In Figs. 2 to 5 of the drawing, the welding cartridge is shown in detail and comprises essentially a central mass of heat-producing compound 5 into which the wires 6, 7 are introduced. The compound 5 is preferably inclosed in a container which consists of a shell 8 of any desired form and material, preferably having an interlining 9 of insulating material. This insulating material is of a character having a high melting point though being subject to solidification very rapidly after being reduced to a semi-liquid state by heat.

Where it is not desired to insulate the joint to be formed, the insulating material 9 may be dispensed with, but the drawings illustrate the welding cartridge in a form applicable to welding electric wires.

Centrally arranged in the container is a web or fuse 10 preferably of a combustible material though it is essential that it be a good electrical insulator in the event the cartridges are ignited by a jump spark.

Each end of the container has a temporary closure 11, 12 of suitable material which may be readily perforated for the introduction of the wire and there is preferably arranged between the mass of compound 5 and the heads 11 and 12 a packing 13 which will act as a gas absorbent and is preferably of a carbonaceous nature. Lampblack or finely divided carbon may be utilized. This packing is not an absolute essential of the device but proves efficient in absorbing gases generated by the chemical compound 5 and acts as a seal to prevent oxidization of the materials of the compound.

The compound 5 is not described in detail herein as this forms the subject-matter of a separate application. It is sufficient herein to state that said compound is of a chemical character, said chemicals being mixed with copper where the cartridge is to be used for welding copper wires.

Obviously, other metals may be employed depending upon the character of joint which it is desired to form between the two ends of the wire and depending upon whether a welded, brazed or soldered joint is desired. As applied to the copper wires of electric circuit as described herein, there is a considerable content of copper in the mass 5, or a considerable content of iron when applied to steel and iron wires.

The web or fuse 10 which is preferably centrally arranged with reference to the container provides for the required gap between the ends of the wires 6, 7 and prevents forcing the wires beyond each other or into contact with each other. It also serves as a guide to the operator to insure the proper spacing of the wires so that an arc will be formed between them when a current is passed over the wiring system. As illustrated in Fig. 2, the insulation is cut away from the wires 6, 7 and only the wires are introduced into the cartridge.

In Fig. 5 the device is illustrated as being used in conjunction with wires where the insulation has not been carefully removed for a definite distance as it has been in the case of Fig. 2.

In Fig. 5 the ends of the wire are bared so that they may abut against the central web or fuse 10ª and the insulation is left about the wire and is forced into the cartridge and into the mass of combustible heat-producing material 5. It has been found that certain characters of insulating wire employing tarry substances act immediately as a gas absorbent and therefore there is no objection whatever to their being introduced into the mass of chemical material 5.

As illustrated in the drawings, a powder fuse connection 14 may be employed for igniting the charge of material 5, it, of course, being understood that this fuse may be used in lieu of an electric spark between the adjacent ends of the conducting wires 6 and 7. Where this fuse is employed, of course, the application is local. Where the electric spark or the metallic fuse is employed, the current passing through the entire system will cause a sufficient spark at the adjacent ends of the wires in each cartridge to simultaneously fire the charges of all of the cartridges and this latter manner of firing the cartridges is preferred in wiring systems.

Of course, it is to be understood that the compound 5 when ignited produces an intense heat and a sufficient heat to thoroughly reduce the copper or metal contained in the compound as well as the adjacent ends of the wires 6 and 7 so that said wires will be positively united and inasmuch as the heat anneals the ends of the wires and forms a globule of metal at their adjacent ends, an electrical joint or union is provided which has a lower resistance and higher capacity than any other section of the conductors. It is therefore obvious that instead of having joints of high resistance as in the case of poorly soldered joints, the connections of the wires will be of appreciably lower resistance and are definitely congealed into a homogeneous mass of metal. Joints so made are not subjected during life to the destroying chemical effect of remaining traces of soldering acid or paste. They provide a perfect union of the metals so that there is in effect no joint or connection.

As the heat-producing mass 5 is ignited, the generated heat reduces the container or the insulating material forming a part thereof and this, as soon as the compound is consumed, congeals about the joint which has been formed between the ends of the wires. Thus, by a simple operation, all of the joints of a circuit or circuits may be simultaneously formed and insulated. The advantages for a wiring system are obvious.

It is, of course, to be understood that the exact form of cartridge illustrated and described herein is not essential to the invention but shows an applicable form for uniting wires of an electrical wiring system. Naturally, the invention may be applied in any desired manner, and provides the necessary mechanical or tensile strength essential to pole line construction.

What I claim as my invention and desire to secure by Letters Patent is:

1. A device for uniting metals consisting of a container having perforate ends through which two metallic members to be joined may be inserted and brought into close juxta-position, a charge of material arranged therein, said material capable of producing an intense heat when ignited and a fuse for igniting said material.

2. A cartridge for uniting metals comprising a container, a charge of heat-producing material arranged therein and having a capacity for producing an intense heat and a non-conducting web arranged in the container and against which the metals to be joined may impinge.

3. A cartridge for welding copper wires which consists of a container having perforate heads through which the wires may be passed at opposite ends of the container, said container inclosing a compound having a capacity of producing intense heat, a central web for spacing the inserted wires whereby an arc will be formed between the wires upon the passage of a current of electricity over the wires and a gas absorbent intermediate the compound and perforate heads forming a seal for the compound.

4. A cartridge for welding copper wires comprising a container having an interior lining of insulating material, a compound arranged in said container, said container and contained compound adapted to receive from opposite ends the wires or metallic parts to be welded, which parts may be forced into said container and its contents and brought into close juxtaposition with each other, said compound having a content of copper and being capable of producing an intense heat upon being ignited and means for igniting said compound.

5. A plurality of cartridges for welding broken copper wires comprising containers provided with a charge of material arranged in each container, said material capable of producing an intense heat when ignited at the adjacent ends of the wire to be joined and means for igniting the material at said wire ends by passing a current of electricity over the wire to be joined whereby the compound incasing the ends of the wires at their adjacent broken ends will be ignited.

A. KELLOGG SLOAN.

Witnesses:
R. G. FORD,
GEORGE L. MOORE.

Copies of this patent may be obtained for five cents each, by addressing the "Commissioner of Patents, Washington, D. C."